United States Patent
Sun et al.

(10) Patent No.: US 9,025,708 B1
(45) Date of Patent: May 5, 2015

(54) METHOD AND APPARATUS FOR DETECTING A DESIRED SIGNAL IN THE PRESENCE OF AN INTERFERING SIGNAL

(71) Applicant: Marvell International Ltd., Hamilton (BM)

(72) Inventors: Yakun Sun, Sunnyvale, CA (US); Krishna Srikanth Gomadam, San Jose, CA (US); Jiwoong Choi, Mountain View, CA (US); Raphael Cendrillon, Palo Alto, CA (US); Hui-Ling Lou, Sunnyvale, CA (US); Yan Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/331,557

(22) Filed: Jul. 15, 2014

Related U.S. Application Data

(63) Continuation of application No. 13/659,709, filed on Oct. 24, 2012, now Pat. No. 8,787,483.

(60) Provisional application No. 61/551,339, filed on Oct. 25, 2011.

(51) Int. Cl.
| | |
|---|---|
| *H04L 1/02* | (2006.01) |
| *H04L 1/00* | (2006.01) |
| *H04B 7/04* | (2006.01) |
| *H04L 27/00* | (2006.01) |

(52) U.S. Cl.
CPC .......... *H04L 1/0048* (2013.01); *H04B 7/0413* (2013.01); *H04L 27/0012* (2013.01)

(58) Field of Classification Search
USPC ........... 375/260, 267, 316, 340–341; 455/524
See application file for complete search history.

(56) References Cited

U.S. PATENT DOCUMENTS

| | | | |
|---|---|---|---|
| 2009/0016465 A1* | 1/2009 | Ramesh | 375/324 |
| 2009/0279442 A1 | 11/2009 | Rave | |
| 2010/0118921 A1* | 5/2010 | Abdelmonem et al. | 375/148 |
| 2011/0038328 A1* | 2/2011 | Wang et al. | 370/329 |
| 2012/0082197 A1 | 4/2012 | Jonsson et al. | |
| 2013/0028305 A1* | 1/2013 | Gollakota et al. | 375/219 |
| 2013/0286867 A1* | 10/2013 | Davydov et al. | 370/252 |
| 2013/0301757 A1* | 11/2013 | Dao et al. | 375/340 |
| 2014/0079107 A1* | 3/2014 | Abdelmonem et al. | 375/224 |
| 2014/0160949 A1* | 6/2014 | Clausen et al. | 370/252 |

* cited by examiner

*Primary Examiner* — Khanh C Tran

(57) ABSTRACT

In accordance with an embodiment, there is provided a method comprising receiving, at a receiver, a desired signal and an interfering signal, wherein the interfering signal was transmitted with a modulation unknown to the receiver; identifying a likely modulation corresponding to the modulation with which the interfering signal was transmitted; and decoding the desired signal using a modulation dependent multiple-input multiple output (MIMO) detection, wherein the modulation dependent MIMO detection is based at least in part on the identified likely modulation corresponding to the modulation with which the interfering signal was transmitted, wherein the modulation dependent MIMO detection includes maximum likelihood (ML) detection.

20 Claims, 2 Drawing Sheets

METHOD AND APPARATUS FOR DETECTING A DESIRED SIGNAL IN THE PRESENCE OF AN INTERFERING SIGNAL

CROSS-REFERENCE TO RELATED APPLICATION

This disclosure is a continuation of and claims priority to U.S. patent application Ser. No. 13/659,709, filed Oct. 24, 2012, now U.S. Pat. No. 8,787,483, issued Jul. 22, 2014, which claims priority to U.S. Provisional Patent Application No. 61/551,339, filed Oct. 25, 2011, which are incorporated herein by reference.

TECHNICAL FIELD

This disclosure relates to multiple-input multiple-output (MIMO) systems, and more specifically, to receivers implemented in MIMO systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In wireless communication systems, multiple-input and multiple-output (MIMO) refers to an use of multiple antennas at both a transmitter and a receiver to improve communication performance. MIMO technology has attracted attention in wireless communications, because MIMO offers significant increase in data throughput and link range without additional bandwidth or increased transmit power. MIMO achieves this by, for example, spreading the same total transmit power over the antennas to achieve an array gain that improves the spectral efficiency (e.g., more bits per second per hertz of bandwidth) or to achieve a diversity gain that improves a link reliability (e.g., reduced fading). Because of these properties, MIMO is an important part of various modern wireless communication systems.

SUMMARY

In accordance with an embodiment, there is provided a method comprising receiving, at a receiver, a desired signal and an interfering signal, wherein the interfering signal was transmitted with a modulation unknown to the receiver; identifying a likely modulation corresponding to the modulation with which the interfering signal was transmitted; and decoding the desired signal using a modulation dependent multiple-input multiple output (MIMO) detection, wherein the modulation dependent MIMO detection is based at least in part on the identified likely modulation corresponding to the modulation with which the interfering signal was transmitted, wherein the modulation dependent MIMO detection includes maximum likelihood (ML) detection.

There is also provided, in accordance with an embodiment, a system comprising one or more antennas configured to receive a desired signal and an interfering signal, wherein the interfering signal was transmitted with a modulation unknown to the system; and a data processing unit coupled to the one or more antennas, wherein the data processing unit is configured to (i) identify a likely modulation or the likelihood of a modulation corresponding to the modulation with which the interfering signal was transmitted, and (ii) decode the desired signal using a modulation dependent detection, wherein the modulation dependent detection is based at least in part on the identified likely modulation or the identified likelihood of the modulation corresponding to the modulation with which the interfering signal was transmitted, wherein the modulation dependent detection includes maximum likelihood (ML) detection.

BRIEF DESCRIPTION OF THE DRAWINGS

Embodiments of the present disclosure will be readily understood by the following detailed description in conjunction with the accompanying drawings. To facilitate this description, like reference numerals designate like elements.

DETAILED DESCRIPTION

Described herein are example systems, components, and methods that may be used in conjunction with MIMO (multiple-input/multiple-output) and/or MU-MIMO (multi-user MIMO) techniques. The following description merely provides examples and is in no way intended to limit the disclosure, its application, or uses.

A MIMO receiver (also referred to herein more generally as a "receiver") typically receives a signal that carries a plurality of effective data signals, only some of which is intended for the receiver. The effective data signal intended for the receiver, referred to herein as the desired signal, may be decoded using a corresponding channel transfer matrix, also referred to as a channel matrix. Other effective data signals, referred to as interfering signals, are associated with different channel matrices. In some cases, the channel matrices of interfering signals may be known or may be estimated.

The effective signals described above may be transmitted using different modulations. Available modulations may include, for example, various implementations of quadrature amplitude modulation (QAM), quadrature phase shift keying (QPSK), and others. In some situations, the modulations used by interfering signals may not be known to a receiver. This may be the case, for example, when interfering signals are the result of multi-user MIMO or co-channel interference.

This disclosure is directed to mitigating interference in an MIMO environment in which a receiver is able to identify presence of interfering signals and their corresponding channel matrices, but in which the modulations of the interfering signals are not known to the receiver.

Figure 1:
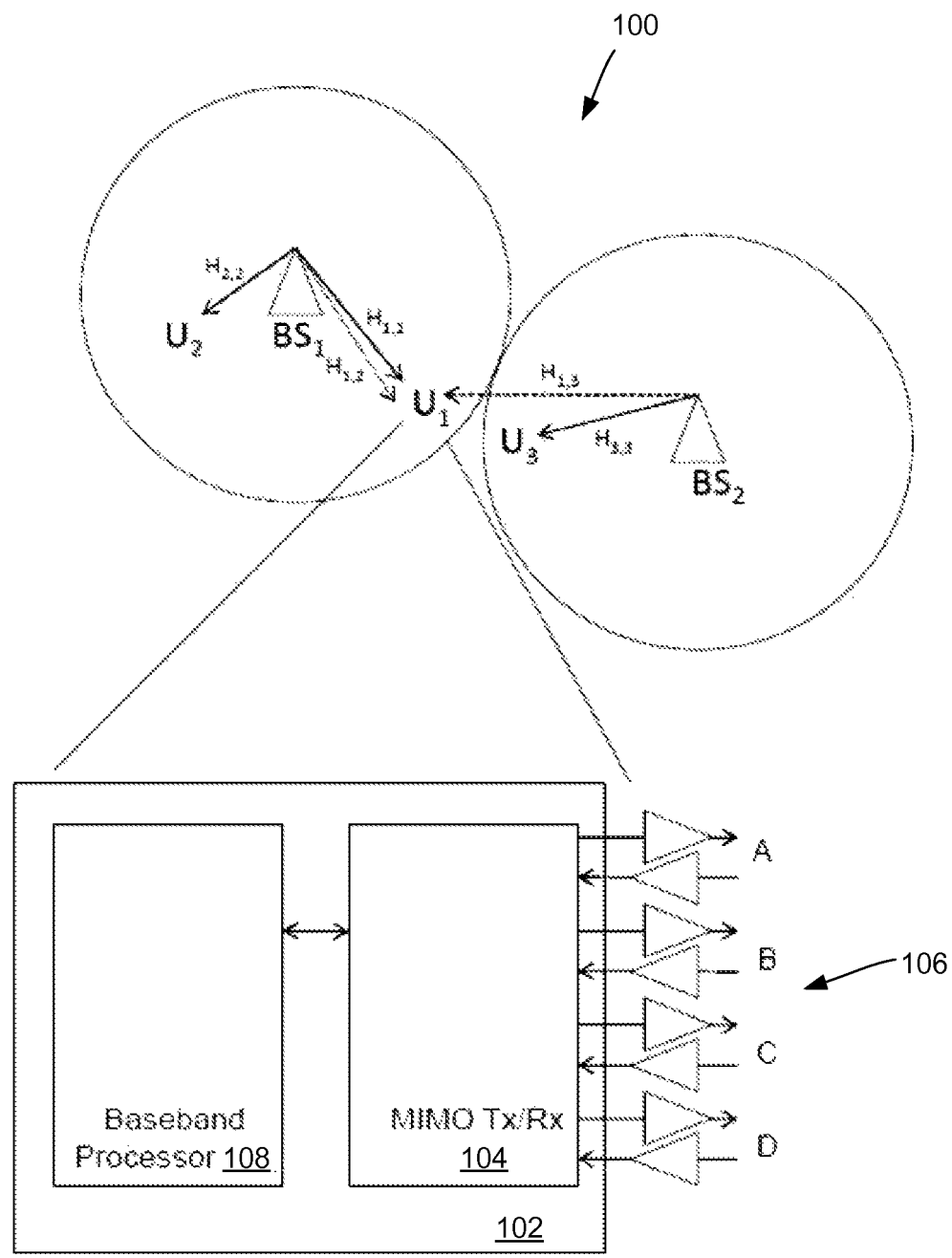
FIG. 1 is a block diagram illustrating a communications system.

FIG. 1 illustrates an example multiple-user multiple-input/multiple-output (MU-MIMO) communication system 100. Three mobile devices (e.g., mobile devices that communicate data by way of radio transmissions) $U_1$, $U_2$, and $U_3$ are interfacing with the system 100. The system 100 includes two base stations (e.g., cellular telephone transmitter/receivers towers) $BS_1$ and $BS_2$. An approximate boundary for each base station's range, referred to as the base station's "cell", is shown as a circle surrounding the base station. While the systems and methods herein will be described in the context of a multiuser MIMO environment, the systems and method may be used in any communication system in which a signal detection technique accounts for the potential existence of a number of interfering communication channels.

Base station $BS_1$ communicates with the mobile device $U_1$ by way of an effective signal, which is defined or characterized by a channel matrix $h_{1,1}$. $BS_1$ also communicates with the mobile device $U_2$ by way of effective signal defined or characterized by a channel matrix $h_{2,2}$. The signal being transmitted to $U_2$ may interfere with the signal being transmitted to $U_1$. This intra-cell interfering signal travels along an effective channel characterized by a channel matrix $h_{1,2}$ to $U_1$.

Because many modern wireless communication systems have adjacent cells transmitting in the same frequency bands, mobile devices are also subject to inter-cell interference. The base station $BS_2$ exchanges signals with the mobile device $U_3$ by way of an effective channel characterized by the channel matrix $h_{3,3}$. This signal also interferes with the signal being transmitted by $BS_1$ to $U_1$.

The following discussion focuses on operations performed at a receiver that receives multiple signals, each of which is characterized by a different channel matrix $h_i$, where the suffix i is an index corresponding to an individual signal and channel matrix. Thus, if a receiver receives two effective signals $x_1$ and $x_2$, those effective signals may be characterized by channel matrices $h_1$ and $h_2$, respectively. While the following discussion focuses on the two data streams, the teachings of this disclosure applies to systems that can handle a larger number of data streams.

One embodiment of a wireless signal processing unit 102 is shown in FIG. 1. The wireless signal processing unit 102 is part of the mobile device $U_1$. The wireless signal processing unit 102 includes a MIMO transmitter/receiver radio 104. The radio 104 includes four antennas 106 that are configured to receive a signal r containing multiple effective signals x. The radio 104 provides the signal r to a baseband processor 108. The baseband processor 108 combines performing signal detection and/or filtering based on information about the channels of the received signal to estimate a desired signal meant for the particular mobile device $U_1$.

The signal processing unit 102 from FIG. 1 may be implemented on a chip including one or more integrated circuits configured to perform one or more of the functions described herein. The signal processing unit 102 may be implemented in a computing device, for example, a computer, a laptop, a server, a cell phone, a hand held computing device, or other type of device that uses memory. The baseband processor 108 may be part of the same device as the signal processing unit 102 or may be external to the apparatus. The signal processing unit 102 may be configured by way of instructions stored in associated computer-readable media, which are executable by the processing unit 102 to perform the computations, calculations, and/or operations described below.

The general characteristics of MIMO transmission, assuming a number of users K, may be characterized as follows:

$$r(i) = H(i)x(i) + n(i) = H_1(i)x_1(i) + \sum_{k=2}^{K} H_k(i)x_k(i) + n(i) \; 1 \le i \le L$$

r: $N_R \times 1$ received vector $$H : N_R \times \sum_{k=1}^{K} N_{T,k}$$

effective MIMO channel, where $H=[H_1 \ldots H_K]$ $$x : \sum_{k=1}^{K} N_{T,k} \times 1$$

transmitted vector $x_1$: transmitted signal for the desired user of modulation $M^{(1)}$ $x_k$: transmitted signal for the interferer of modulation $M^{(k)}$, k=2 ... K n: white noise at receiver, such that $E(nn^H)=\sigma^2 I$ $N_R$: number of receiver antennas $N_{T,k}$: number of transmit antennas (number of spatial streams) of each user i: a transmission instance out of total L transmissions, such as an index of subcarriers.

For ease of explanation, the following discussion will assume two rank-1 users, resulting in the following simplification of Equation 1:

$$r(i)=H(i)x(i)+n(i)=h_1(i)x_1(i)+h_2(i)x_2(i)+n(i) \; 1 \le i \le L \quad \text{Equation 2}$$

H: $N_R \times 2$ effective MIMO channel, where $H=[h_1 \; h_2]$ x: $2 \times 1$ transmitted vector $x_1$: transmitted signal for the desired user of modulation $M^{(1)}$ $x_2$: transmitted signal for the interferer of modulation $M^{(2)}$, $M^{(2)} \in \Psi$ The channel or channel matrix associated with the desired signal $x_1$ is represented as $h_1$. The channel or channel matrix associated with the interfering signal $x_2$ is represented as $h_2$.

It is assumed in the following discussion that the existence of the interfering signal is known, and that the channel matrix $h_2$ of the interfering channel has been obtained from advanced channel estimation techniques. For example, the channel matrix $h_2$ may be calculated as the orthogonal RS sequence of transmission mode 8 of the "Long Term Evolution" (LTE) Rel. 9 specification.

It is further assumed that the modulation $M^{(2)}$ of the interfering signal $x_2$ is chosen from a finite set $\psi$ of possible modulations, and that the composition of this set is known by the receiver. For example, if the receiver knows the wireless system from which the interference comes from, the receiver may also know a set of all possible modulations for the interference. However, the particular modulation $M^{(2)}$ being used by the interfering signal $x_2$ is not known at the receiver.

The interfering effective signal may be associated with a co-scheduled MU-MIMO channel, or may be associated with a co-channel in a neighboring system (e.g., a neighboring cell for a cellular system, or a nearby access point for a WiFi system).

Generally, an MMSE receiver can be applied to detect a received signal $x_1$, without knowledge of the modulation of an interfering signal $x_2$, as follows:

$$\tilde{x}_1 = [H^H(HH^H + \sigma^2 I)^{-1}]_{(1,:)} r = h_1^H (HH^H + \sigma^2 I)^{-1} r \Rightarrow \hat{x}_1 = Q(\tilde{x}_1; M^{(1)}) \quad \text{Equation 3}$$

The MMSE receiver of Equation 3 works regardless of the modulation used in the interfering signal, and is a conventional solution for interference mitigation. In Equation 3, Q(.;M) is a slicer based on the modulation M, as an example for decision. In some embodiments, a hard slicer is replaced by a soft decision (e.g., a bit-wise log-likelihood-ratio, or LLR) calculator taking the MMSE receiver output $\tilde{x}_1$ as input.

In cases where the modulation $M^{(2)}$ of an interfering signal is known, a modulation-dependent receiver may outperform a modulation independent receiver such as the MMSE receiver, in which the interference is treated as Gaussian noise. For example, ML detection as an example of modulation-dependent receiver can be applied as follows:

$$\hat{x}_1 = \underset{x_1 \in \Omega^{(M^{(1)})}, x_2 \in \Omega^{(M^{(2)})}}{\arg\min} \|r - h_1 x_1 - h_2 x_2\|^2 \quad \text{Equation 4}$$

Equation 4 shows an example of hard decision using ML cretirion. A soft decision (such as bit-wise LLR) can also be used in some embodiments following ML cretirion. Other examples of modulation dependent receiver include decisionfeedback equalizer, interference cancellation, and/or the like. In some of the embodiments discussed herein later, ML detection is used as an example.

However, the modulation $M^{(2)}$ of the interfering effective signal $x_2$ is often unknown. Described below are various methods, techniques, and enhancements for performing ML detection even in situations where the modulation $M^{(2)}$ of the interfering signal is unknown.

Figure 2:
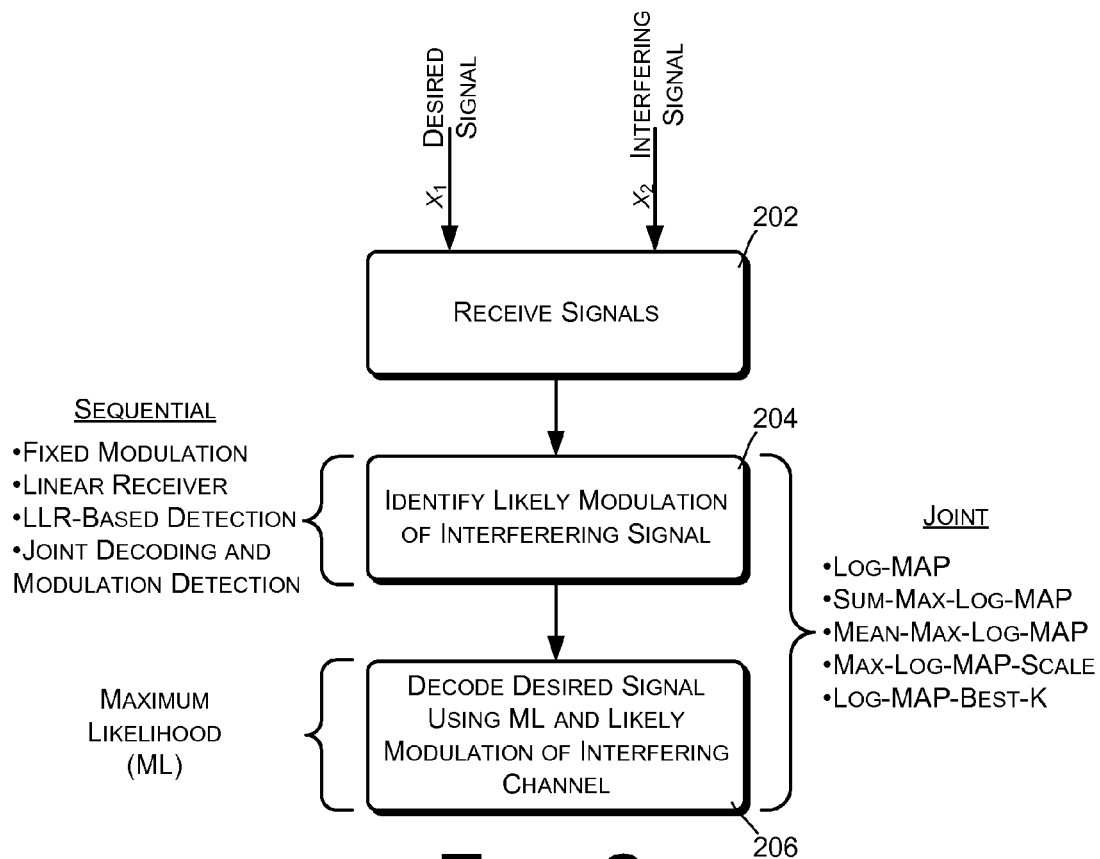
FIG. 2 is a flowchart illustrating a method of decoding a desired signal using maximum likelihood detection.

FIG. 2 illustrates an example of decoding a desired signal $x_1$ associated with a receiver channel $h_1$, in the presence an interfering signal $x_2$ associated with an interfering channel $h_2$. Although the example shows a single interfering signal, the described techniques may be used in a similar fashion to decode the desired signal $x_1$ in the presence of multiple interfering channels.

An action 202 comprises receiving the desired signal $x_1$ and the interfering signal $x_2$. The signals may be generated by different transmitters or base stations, and/or from different antennas of a single transmitter or base station. The modulation of the interfering signal $x_2$ is unknown to the receiver.

An action 204 comprises identifying a likely modulation of the interfering signal $x_2$. This may be performed in a number of different ways, as will be described below. In certain embodiments, the action 204 may comprise estimating, calculating, or otherwise determining a modulation $\hat{M}^{(2)}$ that is assumed to be used by the interfering channel $h_2$.

The action 204 may be generally characterized by the following equation:

$$\hat{M}^{(2)} = f(h_1, h_2, r, M^{(1)}, \sigma^2) \quad \text{Equation 5}$$

An action 206 comprises applying maximum likelihood (ML) detection, based at least in part on the assumed modulation $\hat{M}^{(2)}$, in order to obtain the desired signal $x_1$. An example of ML detection to determine a hard estimate of $x_1$ is generally characterized by the following equation:

$$\hat{x}_1 = \underset{x_1 \in \Omega^{(M^{(1)})}, x_2 \in \Omega^{(M^{(2)})}}{\arg \min} \|r - h_1 x_1 - h_2 x_2\|^2 \quad \text{Equation 6}$$

where $\Omega$ is the set of possible or available modulations that may have been used by the desired signal and the interfering signal. A bit-wise soft decision can also be determined in some embodiments in a similar fashion with the assumed modulation $\hat{M}^{(2)}$. In the following discussion and as an example, hard decision is used without excluding the application of the techniques to soft decision.

The actions 204 and 206 may in some cases be combined, using calculations that jointly determine both the desired signal $x_1$ and the assumed modulation $\hat{M}^{(2)}$ as follows:

$$\{\hat{x}_1, \hat{M}^{(2)}\} = G(h_1, h_2, r, M^{(1)}, \sigma^2) \quad \text{Equation 7}$$

The calculations of Equations 5, 6, and 7 are implemented to minimize a cost function over all possible modulations:

$$\hat{M}^{(2)} = \underset{M^{(2)} \in \Psi}{\min} f_{M^{(2)}}(h_1, h_2 r, M^{(1)}, \sigma^2) \quad \text{Equation 8}$$

Joint ML Sequence and Modulation Detection

An example of applying Equation 7 is that the actions 204 and 206 may be performed jointly, by evaluating the a-posteriori probabilities of the different available modulations of the set ψ in combination with the decoded desired signal $x_1$. Evaluation of a-posteriori probabilities may be performed in several different ways, as indicated along the right side of FIG. 2, under the heading "Joint".

Log-MAP

A method referred to herein as "Log-MAP" may be used to maximize the a-posteriori probability of the desired signal $x_1$ and the assumed modulation $\hat{M}^{(2)}$ of the interfering signal $x_2$, given the signal r, as follows:

$$\{\hat{x}_1(1) \ldots \hat{x}_1(L), \hat{M}^{(2)}\} = \underset{M^{(2)} \in \Psi}{\arg \max} P(x_1(1) \ldots x_1(L), M^{(2)} | r) \quad \text{Equation 9}$$

Where L is the number of signals in the sequence.

Eq. 9 may be implemented, in an embodiment, as follows:

$$\{\hat{x}_1(1) \ldots \hat{x}_1(L), \hat{M}^{(2)}\} = \underset{M^{(2)}, x_1, x_2}{\arg \max} \left(\frac{1}{M^{(2)}}\right)^L \quad \text{Equation 10}$$

$$\prod_{l=1}^{L} \left( \sum_{m=1}^{M^{(1)}} \sum_{n=1}^{M^{(2)}} \exp\left(-\frac{\|r(i) - h_1(i)x_1^{(m)} - h_2(i)x_2^{(n)}\|^2}{\sigma^2}\right) \right)$$

Equation 10 assumes that any residual noise is Gaussian, and that each of the available modulations has an equal a-priori probability of being used by the interfering channel. Equation 10 finds the a-posteriori probabilities of all possible modulations, and then selects the modulation having the highest a-posteriori probability.

In some situations, certain modulations are more likely to be used than others. In these situations, Eq. 9 may be implemented as follows, to account for the differing a-priori probabilities of each modulation:

$$\{\hat{x}_1(1) \ldots \hat{x}_1(L), \hat{M}^{(2)}\} = \underset{M^{(2)}, x_1, x_2}{\arg \max} P(M^{(2)}) \left(\frac{1}{M^{(2)}}\right)^L \quad \text{Equation 11}$$

$$\prod_{l=1}^{L} \left( \sum_{m=1}^{M^{(1)}} \sum_{n=1}^{M^{(2)}} \exp\left(-\frac{\|r(i) - h_1(i)x_1^{(m)} - h_2(i)x_2^{(n)}\|^2}{\sigma^2}\right) \right)$$

In the following discussion and as an example, the equal a-priori probabilities of each modulation is used without excluding the scenarios of unequal a-priori probabilities of each modulation.

Sum-Max-Log-MAP

The Log-MAP method of maximizing the a-posteriori probability of the desired signal $x_1$ and the modulation $\hat{M}^{(2)}$ of the interfering channel may be refined using a method referred to herein as "Sum-Max-Log-MAP". Specifically, equations 10 and 11 can be implemented in a less complex fashion by approximating the sum of the a-posteriori probabilities, where a core part of Equations 10 and 11 is replaced by a simplification. In particular, the term $$\frac{1}{M^{(2)}} \sum_{m=1}^{M^{(1)}} \sum_{n=1}^{M^{(2)}} \exp\left(-\frac{\|r(i) - h_1(i)x_1^{(m)} - h_2(i)x_2^{(m)}\|^2}{\sigma^2}\right)$$

of Equations 10 and 11 may be replaced by the following expression:

$$\frac{1}{M^{(2)}}\exp\left(-\frac{\min\|r(i)-h_1(i)x_1^{(m)}-h_2(i)x_2^{(n)}\|^2}{\sigma^2}\right) \quad \text{Equation 12}$$

The Approximation Leads to Little Performance Loss, for Example, when Signal to Noise Ratio (SNR) is Relatively High.

For example, when the probability of each M2 is equal, the desired signal $x_1$ and the modulations $\hat{M}^{(2)}$ of the interfering signal $x_2$ are then obtained by comparing the average minimum distance per modulation with an offset:

$$\{\hat{x}_1(1) \ldots \hat{x}_1(L), \hat{M}^{(2)}\} = \underset{M^{(2)},x_1,x_2}{\arg\max}\left(\frac{1}{M^{(2)}}\right)^L \quad \text{Equation 13}$$

$$\exp\left(-\sum_{l=1}^{L}\frac{\min\|r(i)-h_1(i)x_1^{(m)}-h_2(i)x_2^{(n)}\|^2}{\sigma^2}\right) =$$

$$\underset{}{\arg\min}\left(\frac{1}{L}\sum_{l=1}^{L}\frac{\min\|r(i)-h_1(i)x_1^{(m)}-h_2(i)x_2^{(n)}\|^2}{\sigma^2} + \log(M^{(2)})\right)$$

Mean-Max-Log-MAP

Alternatively, for example, when the SNR is relatively low, Equations 10 and 11 can be implemented using a method referred to herein as "Mean-Max-Log-MAP", which comprises approximating the mean probability by the maximum probability. Specifically, the term $$\frac{1}{M^{(2)}}\sum_{m=1}^{M^{(1)}}\sum_{n=1}^{M^{(2)}}\exp\left(-\frac{\|r(i)-h_1(i)x_1^{(m)}-h_2(i)x_2^{(n)}\|^2}{\sigma^2}\right)$$

of Equations 10 and 11 is replaced by the following expression:

$$\exp\left(-\frac{\min\|r(i)-h_1(i)x_1^{(m)}-h_2(i)x_2^{(n)}\|^2}{\sigma^2}\right) \quad \text{Equation 14}$$

For example, when the probability of each M2 is equal, the desired signal $x_1$ and modulation $\hat{M}^{(2)}$ of the interfering signal are then obtained as follows:

$$\{\hat{x}_1(1) \ldots \hat{x}_1(L), \hat{M}^{(2)}\} = \quad \text{Equation 15}$$

$$\underset{M^{(2)},x_1,x_2}{\arg\max}\left(\frac{1}{L}\sum_{i=1}^{L}\frac{\min\|r(i)-h_1(i)x_1^{(m)}-h_2(i)x_2^{(m)}\|^2}{\sigma^2}\right)$$

Max-Log-MAP-Scale

In cases where it is difficult or impractical to make a decision regarding SNR, the Equations 10 and/or 11 may be implemented as follows, independently of SNR values:

$$\{\hat{x}_1(1) \ldots \hat{x}_1(L), \hat{M}^{(2)}\} = \quad \text{Equation 16}$$

$$\underset{M^{(2)},x_1,x_2}{\arg\max}\left(\frac{1}{M^{(2)}}\right)^L \prod_{l=1}^{L}\left(\frac{1+\alpha(H,M^{(1)},M^{(2)},\sigma^2)}{M^{(2)}} \cdot \exp\left(-\frac{\min\|r(i)-h_1(i)x_1^{(m)}-h_2(i)x_2^{(n)}\|^2}{\sigma^2}\right)\right) =$$

$$\underset{M^{(2)},x_1,x_2}{\arg\max}\frac{1}{L}\sum_{l=1}^{L}\left(\frac{\min\|r(i)-h_1(i)x_1^{(m)}-h_2(i)x_2^{(n)}\|^2}{\sigma^2} - \log(1+\alpha(H,M^{(1)},M^{(2)},\sigma^2))\right) + \log(M^{(2)})$$

In Equation 16, the term $$1+\alpha(H,M^{(1)},M^{(2)},\sigma)/M^{(2)}$$

is a scaling factor that is used to scale the subsequent exponential term of Equation 16. The scaling factor can be approximated and stored as a lookup table to lessen the complexity of calculating Equation 16. The desired signal $x_1$ and the modulation $\hat{M}^{(2)}$ of the interfering channel $x_2$ may be calculated in this scenario as follows:

$$\{\hat{x}_1(1) \ldots \hat{x}_1(L), \hat{M}^{(2)}\} = \quad \text{Equation 17}$$

$$\underset{M^{(2)},x_1,x_2}{\arg\max}\frac{1}{L}\sum_{i=1}^{L}\left(\frac{\min\|r(i)-h_1(i)x_1^{(m)}-h_2(i)x_2^{(m)}\|^2}{\sigma^2}\right) + I(r;x_1,x_2|M^{(1)},M^{(2)},H)$$

Log-MAP-Best-K

As yet another example, a balance between accuracy and complexity may be obtained when calculating Equations 10 and 11 using a method referred to herein as "log-MAP-Best-K", which comprises computing only the largest K terms in the sum of conditional probabilities, as follows:

$$\{\hat{x}_1(1) \ldots \hat{x}_1(L), \hat{M}^{(2)}\} \approx \quad \text{Equation 18}$$

$$\underset{M^{(2)},x_1,x_2}{\arg\max}\frac{1}{M^{(2)}}\sum_{k=1}^{K(M^{(2)})}\exp\left(-\frac{\|r(i)-h_1(i)x_1^{(k,m)}-h_2(i)x_2^{(k,n)}\|^2}{\sigma^2}\right)$$

$$\text{s.t.}\|r(i)-h_1(i)x_1^{(1,m)}-h_2(i)x_2^{(1,n)}\|^2 \leq$$
$$\|r(i)-h_1(i)x_1^{(2,m)}-h_2(i)x_2^{(2,n)}\|^2 \leq \ldots \leq$$
$$\left\|r(i)-h_1(i)x_1^{(M^{(1)}M^{(2)},m)}-h_2(i)x_2^{(M^{(1)}M^{(2)},n)}\right\|^2$$

The depth of this calculation may be dependent on one or more factors including modulation, SNR, and/or the like, and may be adjusted in the real-time.

Sequential Modulation and Sequence Detection

In certain embodiments, the assumed modulation $M^{(2)}$ may be initially determined, and may then be used as the basis for decoding the desired signal $x_1$. This is referred to herein as sequential modulation and sequence detection. The assumed modulation $M^{(2)}$ may be calculated or estimated in various ways, as indicated on the left side of FIG. 2 under the heading "Sequential".

The techniques for joint ML sequence and modulation detection mentioned above can also be implemented in the fashion of sequential modulation and sequence detection discussed hereafter. For example, the modulation of M2 can be detected by maximizing the a-posteriori probability of the desired signal $x_1$ and the assumed modulation $\hat{M}^{(2)}$ of the interfering signal $x_2$, given the signal r, as follows:

$$\hat{M}_2 = \arg\max_{M_2 \in \psi} P(x_1(1) \ldots x_1(L), M_2 \mid r) \qquad \text{Equation 19}$$

And then the determined M2 is used for a ML detection of the desired sequence. That is, $$\hat{x}_1 = \arg\min_{x_1 \in \Omega^{(\hat{M}_1)}, x_2 \in \Omega^{(\hat{M}_2)}} \|r - h_1 x_1 - h_2 x_2\|^2$$

The equations [9] to [18] can be similarly implemented in the sequential fashion. Additionally, some specific examples for sequential modulation and sequence detection are discussed as follows.

Fixed Modulation

As an example of sequentially determining $M^{(2)}$ and $x_1$, the action 204 may be performed by arbitrarily or randomly assuming a modulation $\hat{M}^{(2)}$ of the interfering signal. In this case, $\hat{M}^{(2)}=K$, where K is an arbitrarily assumed modulation belonging to the known set $\psi$ of available modulations. The desired signal $x_1$ may be calculated in the action 206 by performing ML detection based on this assumption of a fixed modulation for the interfering signal, as follows:

$$\hat{x}_1 = \arg\min_{x_1 \in \Omega^{(M^{(1)})}, x_2 \in \Omega^{(K)}} \|r - h_1 x_1 - h_2 x_2\|^2 \qquad \text{Equation 20}$$

As another example of sequentially determining $M^{(2)}$ and $x_1$, the action 204 may be performed by assuming the superposition of all possible modulations of the interfering signal. Thus, assuming that the known set $\psi$ of modulations comprises, for example, QPSK, QAM16, and QAM64 modulations, the action 206 of calculating the desired signal $x_1$ can be calculated by performing ML detection as follows:

$$\hat{x}_1 = \qquad \text{Equation 21}$$
$$\arg\min_{x_1 \in \Omega^{(M_1)}, x_2 \in \Omega^{(QPSK)} \cup \Omega^{(QAM16)} \cup \Omega^{(QAM64)}} \|r - h_1 x_1 - h_2 x_2\|^2$$

Linear Receiver with Modulation Detection

Sequential determination of $M^{(2)}$ and $x_1$ may also be performed by implementing a linear receiver for the interfering signal $x_2$, to detect the modulation $\hat{M}^{(2)}$ of $x_2$. The action 204 may be performed by a linear receiver using MMSE, zero-forcing (ZF), maximal ratio combining (MRC), and/or other types of linear detection schemes. In an embodiment, an MMSE receiver may implemented as follows:

$$\tilde{x}_2 = C_{linear} r^{MMSE} = \alpha h_2^H (HH^H + \sigma^2 I)^{-1} r = x_2 + z \qquad \text{Equation 22}$$
$$\sigma_s^2 = E[|z|^2] = \frac{1}{SINR_{MMSE}}$$

Based on Equation 22, a modulation detector may be implemented to determine an assumed modulation $\hat{M}^{(2)}$ of the interfering signal $x_2$ as follows:

$$\hat{M}^{(2)} = \arg\min_{M^{(2)} \in \Psi} J(\tilde{x}_2(1) \ldots \tilde{x}_2(L), M^{(2)}, \sigma_z^2) \qquad \text{Equation 23}$$

The optimization function J(.) can be derived from the counterpart equations [9] to [18]. The analogy between the optimization functions is that $h_1$ and $x_1$ equal to 0, and $h_2$ equal to 1, also r equal to $\tilde{x}_2$. In other word, the relationship between the transmitted and received signals in Equation [1] and [2] is reduced to a single user case, where the received signals are the output of the linear receiver $\tilde{x}_2$ and the transmitted signal $x_2$ travels through an AWGN channel in absence of $x_1$. By applying the principle of modulation detection, or a-posteriori probability determination in Equation [9] to [18] for the new input-output relationship, the modulation of $x_2$ may be determined accordingly. For example, the log-MAP style function is as follows:

$$\hat{M}_2 = \arg\max_{M_2 \in \psi} \left(\frac{1}{M^{(2)}}\right)^L \prod_{i=1}^{L} \left(\sum_{n=1}^{M^{(2)}} \exp\left(-\frac{|\tilde{x}_2(i) - x_2^{(n)}|^2}{\sigma_z^2}\right)\right)$$

The technique of sum-max-log-MAP, mean-max-log-MAP, max-log-MAP-scale, log-MAP-best-K can be applied similarly.

After determining the assumed modulation of the interfering signal in this manner, the desired signal $x_1$ may be calculated in the action 206 by using ML detection as follows:

$$\hat{x}_1 = \arg\min_{x_1 \in \Omega^{(M^{(1)})}, x_2 \in \Omega^{(\hat{M}^{(2)})}} \|r - h_1 x_1 - h_2 x_2\|^2 \qquad \text{Equation 24}$$

LLR-Based Modulation Detection

The modulation of the interfering signal may also be determined or estimated in the action 204 based on a soft decision or log-likelihood ratio (LLR) of each bit at the output of a receiver, as follows:

$$LLR_k = \log\left(\frac{P(b_1(k) = 1 \mid r)}{P(b_1(k) = 0 \mid r)}\right) \qquad \text{Equation 25}$$

Instead of examining the probability of each symbol in a transmitted sequence, this technique evaluates the probability of each coded bit:

$$LLR_k^{(M^{(2)})} = \log\left(\frac{P(b_1(k) = 1 \mid r, M^{(2)})}{P(b_1(k) = 0 \mid r, M^{(2)})}\right) \qquad \text{Equation 26}$$

$$\hat{M}^{(2)} = \arg\max_{M^{(2)} \in \Psi} J(LLR_k, M^{(2)})$$

For example, the following metric can represent the probability of a correctly decoded bit sequence:

$$J(M^{(2)}) = \prod_{k=1}^{L'} \frac{1}{1 + \exp(-|LLR_k^{(M^{(2)})}|)} \qquad \text{Equation 27}$$

Alternatively, an approximate and simpler solution is as follows:

$$J(M^{(2)}) = \sum_{k=1}^{L'} \left| LLR_k^{(M^{(2)})} \right| \quad \text{Equation 28}$$

Joint Decoding and Modulation Detection

In cases where signals x comprise coded symbols, modulation detection and decoding can be performed jointly or concurrently to determine the most probable modulation $\hat{M}^{(2)}$ of the interfering signal $x_2$. For example, multiple ML detection may be performed in parallel or in sequence, based on all possible $M^{(2)}$ modulations. The resulting outputs may then be fed to channel decoders to produce decoded sequences. Assuming that the symbols of the sequences have error encoding, such as cyclical redundancy check (CRC) encoding, the decoded sequences may be examined to determine whether they exhibit errors. The output sequence exhibiting the lowest error rate or the highest accuracy may then be selected, and the modulation M resulting in that output sequence may be assumed to be the modulation $M^{(2)}$ of the interfering signal.

When CRC is not available, other approaches may be used to select the output sequence that is most likely to be correctly decoded. For example, the mean of the absolute information bit LLR may be used to determine whether an output stream has been correctly decoded.

After determining $M^{(2)}$ in this manner, ML detection may be applied in the action 206 to determine the desired signal $x_1$ based on the determined modulation $M^{(2)}$ of the interfering signal.

Hard Decision Distribution Metric

In an embodiment, the constellation distribution of hard decisions in an MMSE receiver, applied to the interfering channel $x_2$, may be evaluated to determine the likely validity of the previously described decisions regarding $M^{(2)}$. For example, the hard decisions regarding the interfering channel $x_2$ may be evaluated to determine whether they exhibit expected constellation distributions for the assumed modulation $\hat{M}^{(2)}$.

For example, a hard slicer may be applied at the output of a linear receiver such as an MMSE receiver, as follows:

$$\hat{x}_2 = Q(\alpha h_2^H (HH^H + \sigma^2 I)^{-1} r; M^{(2)}) \quad \text{Equation 29}$$

A typical transmitted signal uniformly occupies the constellation. If the hard deicision at the output of hard slicer shows a non-uniform distribution in the assumed constellation, the likelyhood of this assumed modulation, $P(M^{(2)})$, may decrease, or this assumption may become invalid.

For example, for $M^{(2)}>4$, the numbers of hard decisions in different subsets of the constellation of the assumed modulation $\hat{M}^{(2)}$ are calculated, and these numbers are compared to expected distributions within the assumed modulation $\hat{M}^{(2)}$. As an example, the constellation of the assumed modulation $\hat{M}^{(2)}$ may be partitioned into two subsets, and the following ratio may be calculated:

$$\rho^{(M_2)} = \frac{\left|\{\hat{x}_2(i) : \hat{x}_2(i) \in \Omega_1 \subset \Omega^{(M^{(2)})}\}\right|}{\left|\{\hat{x}_2(i) : \hat{x}_2(i) \in \Omega_2 \subset \Omega^{(M^{(2)})}\}\right|} \quad \text{Equation 30}$$

In Equation 30, subset 1 ($\Omega_1$) includes constellation points of the assumed modulation $\hat{M}^{(2)}$ that are relatively likely if the assumed modulation is actually used by the interfering signal $x_2$. Subset 2 ($\Omega_2$) includes the points that relatively likely if the estimated modulation $\hat{M}^{(2)}$ is not used by the interfering signal $x_2$.

The ratio of Equation 30 can be compared to a threshold to determine whether the observed distribution is incorrectly biased relative to the expected distribution of the assumed modulation $\hat{M}^{(2)}$ as follows:

$$\rho^{(M_2)} > \rho_{threshold} \quad \text{Equation 30A}$$

The decision based on Equation 30A may be used to qualify or refine decisions regarding $\hat{M}^{(2)}$ made using the Joint ML Sequence and Modulation Detection or sequential modulation and sequence detection schemes discussed above.

Subsampled Sequences

In the various techniques and methods described above, the interfering channel $x_2$ may be subsampled in order to reduce the number of calculations involved in any given technique. For example, r may be sampled once in every 100 symbols over a received sequence of 10000 symbols, in situations in which the modulation is anticipated to remain constant over at least 10000 symbols.

More particularly, the subsampling may be performed as follows:

$$\hat{M}^{(2)} = \arg\max_{M^{(2)}, x_1, x_2} \left(\frac{1}{M^{(2)}}\right)^{L'} \prod_{j=1}^{L'} \left( \sum_{m=1}^{M^{(1)}} \sum_{n=1}^{M^{(2)}} \exp\left(-\frac{\|r(i) - h_1(i_j)x_1^{(m)} - h_2(i_j)x_2^{(n)}\|^2}{\sigma^2}\right) \right) \quad \text{Equation 31}$$

In addition to applying to log-MAP in Equation 31, subsampling can be applied to the technique of sum-max-log-MAP, mean-max-log-MAP, max-log-MAP-scale, log-MAP-bests-K similarly. Subsampling can be also be applied in combination with other techniques such as hard decision distribution metric discussed above, and adaptive ML/MMSE hereafter.

Adaptive ML/MMSE

In certain embodiments, the ML detection schemes described above may be used when they produce reliable or accurate results, and MMSE may be used in other situations, where noise dominates or the modulation detection is deemed to be unreliable. Various measures or metrics may be used to determine whether the ML modulation detection is or is likely to be reliable and/or accurate. For example, signal-to-noise ratio (SNR) and/or SINR (signal-to-interference/noise ratio) of the interfering channel $x_2$ may be used as indicators of detection reliability.

As another example, the hard decision matrix metric described above, or any other observed quality metric, may be used in determining the actual accuracy or reliability of modulation detection. More specifically, the ratio of the minimum and maximum metrics may be evaluated and compared to a threshold to indicate the likely reliability of modulation detection, as follows:

$$\theta = \frac{\max_{M^{(2)} \in \Psi} J(M^{(2)})}{\min_{M^{(2)} \in \Psi} J(M^{(2)})} \leq \theta_0 \quad \text{Equation 32}$$

Interference Cancellation without Modulation Knowledge

Typically, interference cancellation requires knowledge of the modulation of the interfering signal as well as coding information for the interfering signal. However, the following technique can be used in situations in which the modulation information of the interfering signal is not known at the receiver.

Figure 3:
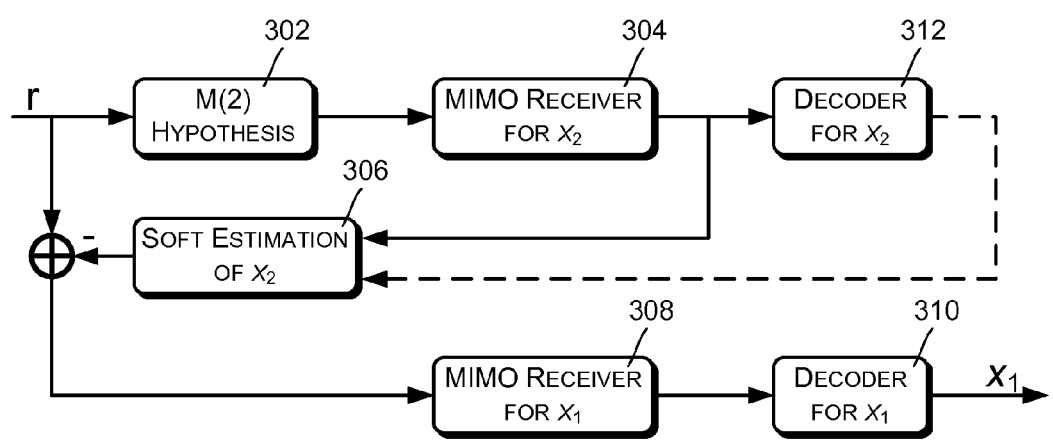
FIG. 3 is a block diagram illustrating a method of decoding a desired signal using interference cancelation.

FIG. 3 shows an example signal flow, illustrating interference cancelation without knowledge of the modulation of the interfering signal. The signal r is received at block 302, which selects one of the available or possible modulations $M^{(2)}$ for $x_2$. A MIMO receiver 304 is applied to the interfering signal $x_2$ and used as the basis for calculating the a-posteriori probability of the selected $M^{(2)}$. The estimated probabilities for all available modulations are provided to a block 306 that calculations soft estimates of the interfering signal $x_2$. These are subtracted from the incoming signal r, and the resulting signal is provided to a MIMO receiver 308 for $x_1$, and a subsequent channel decoder 310 for $x_1$. If coding information is available for the interfering signal $x_2$, a channel decoder 312 may be used and its output provided to the soft estimation 306.

As an example of this process, assuming that coding information for the interfering signal $x_2$ is not available, a linear MMSE receiver may be applied to equalize the MIMO channel as follows:

$$\tilde{x}_2 = \alpha h_2^H (HH^H + \sigma^2 I)^{-1} r = x_2 + z \quad \text{Equation 33}$$

Based on Equation 31, the probability of each available modulation may be calculated as follows:

$$P(M^{(2)}|r) = c \cdot P(r|M^{(2)}) \approx c_1 \cdot \exp\left(-\frac{1}{L}\sum_{i=1}^{L}\frac{|\tilde{x}_2(i) - \bar{x}_2(i)|^2}{\sigma_z^2(i)} - \log(M^{(2)})\right)$$

$$= \frac{\exp\left(-\frac{1}{L}\sum_{i=1}^{L}\frac{|\tilde{x}_2(i) - \bar{x}_2(i)|^2}{\sigma_z^2(i)} - \log(M^{(2)})\right)}{\sum_{M_2 \in \Psi}\exp\left(-\frac{1}{L}\sum_{i=1}^{L}\frac{|\tilde{x}_2(i) - \bar{x}_2(i)|^2}{\sigma_z^2(i)} - \log(M^{(2)})\right)}$$

Equation 34

It is to be noted that the Sum-Max-Log-MAP, as described above, is used in Equation 34 to approximate probabilities. Other described methods, such as Log-MAP, Max-Log-MAP-Scale, and so forth can also be applied here.

It is to also be noted that FIG. 3 is an example in which the probability of modulation is calculated after a linear receiver is applied to detect the interfering signal in Equations 33 and 34. The a-posteriori probability of the modulation can also be calculated directly from the received signals, as in the previous examples of Equation 19. Other described methods, such as Log-MAP, Max-Log-MAP-Scale, Sum/Mean-Max-Log-MAP can also be applied here.

The soft estimation for each hypothesized modulation may then be calculated as follows:

$$E[x_2(i)|r, M^{(2)}] = \sum_{x_2 \in \Omega^{(M^{(2)})}} x_2 \cdot P(x_2|r(i), M^{(2)}) = \quad \text{Equation 35}$$

$$\frac{\sum_{x_2 \in \Omega^{(M^{(2)})}}\left(x_2\exp\left(-\frac{|\tilde{x}_2(i) - \bar{x}_2|^2}{\sigma_z^2(i)}\right)\right)}{\sum_{x_2 \in \Omega^{(M^{(2)})}}\exp\left(-\frac{|\tilde{x}_2(i) - \bar{x}_2|^2}{\sigma_z^2(i)}\right)}$$

Again, the different kinds of Log-MAP techniques described above can be applied to Equation 35 to lower computational complexities of determining the probability of every possible modulated symbol in each modulation.

The soft estimation is then calculated over all possible modulations, as follows:

$$\hat{x}_2(i) = E[x_2(i)|r] = \Sigma_{M^{(2)} \in \Psi} E[x_2|r, M^{(2)}]P(M^{(2)}|r) \quad \text{Equation 36}$$

Based on the soft estimation of Equation 36, the interference may be canceled from the interfering signal $x_2$, and the desired signal $x_1$ may be decoded as follows:

$$\tilde{r}(i) = r(i) - h_2 \hat{x}_2(i) \Rightarrow \hat{x}_1(i) \quad \text{Equation 37}$$

Both FIG. 2 and FIG. 3 involve determining a-posteriori probability of the modulation for the interfering signal. An example difference of the techniques of FIGS. 2 and 3 can be interpreted as a hard and soft detection of the modulation. The techniques in FIG. 2 and the associated variations, for example, make a hard decision on the modulation for the interfering signals based on a-posteriori probabilities and then rely on a modulation-dependent MIMO detection (e.g., ML detection) given the modulation of the interfering signals for interference suppression, or performance improvement. The techniques in FIG. 3 and the associated variations, for example, do not need to determine the modulation of the interfering signals. Instead, the expectation of the interfering signal, or a "soft" usage of the modulation of the interfering signals, is used for interference cancellation in FIG. 3.

A combination of hard and soft modulation detection is possible, where the modulation of the interfering signal is determined, and then a soft expectation of the interfering signals is cancelled from the received signal. This can be interpreted as another example of modulation dependent MIMO detection.

Another combination of soft and hard modulation detection is to find a hard estimate of modulated symbols in each modulation, and determine the expected interfering signals as the sum of each modulated symbols weighted by the probability of the modulation. This can be interpreted as the Sum-Max-Log-MAP technique for determining the probability of each modulated symbol given the modulation.

CONCLUSION

The discussion above assumes two rank-1 users for ease of description. However, the described techniques are not limited to the number of users or the ranks of the users. Rather, the described techniques can be extended to arbitrary numbers of users with arbitrary ranks, where the effective channels are available but the modulations of the channels are unknown at the receiver. For example, ML sequence and modulation detection with Sum-Max-Log-Map techniques may be performed with respect to multiple users in accordance with the following:

Equation 38

$$\{\hat{x}_1(1) \ldots \hat{x}_1(L), \hat{M}^{(2)} \ldots \hat{M}^{(K)}\} = \underset{M^{(2)} \ldots M^{(K)}, x_1 \ldots x_2}{\arg\min} \left\{ \frac{1}{L} \sum_{i=1}^{L} \frac{\min\|r(i) - H_1(i)x_1^{(m_1)}(i) - H_2(i)x_2^{(m_2)}(i) \ldots -H_K(i)x_K^{(m_K)}(i)\|^2 - H_K(i)x_K^{(m_K)}(i)\|^2}{\sigma^2} + \sum_{k=2}^{K} \log(M^{(k)}) \right\}$$

In the case of more than 1 interfering signals, the detection of the modulation for each signal can be done jointly by solving equation 38, for example if Sum-Max-Log-MAP technique is applied. Alternatively (or additionally), the modulation of each signal can be successively detected, treating all the signals with modulations undetected as noise. Another alternative is to detect the modulation of each signal in parallel, treating all the rest signals with modulations as noise. Furthermore, the joint and successive/parallel modulation detection for more than 1 interfering signals can be applied at the same time, for example, by grouping interfering signals, and applying the joint or successive/parallel principle to each group, and then applying the joint or successive/parallel principle within each group.

The discussion above also assume the existence of the interfering signals has been identified. Alternatively, the existence of the interfering signals can be included in the modulation detection by assigning the non-existence of the interfering signals as a special modulation and included in the set of modulations ψ. If the modulation of "non-existence" has been identified as the most likely one, the receiver may deem that the interfering signals are not present.

Note that the description above incorporates use of the phrases "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method, comprising:
receiving, at a receiver, a plurality of signals, wherein the plurality of signals comprises (i) a desired signal and (ii) an interfering signal, and wherein the interfering signal is transmitted with a modulation that is unknown to the receiver;
accessing, by the receiver, a plurality of modulations, wherein one of the plurality of modulations is likely used for transmitting the interfering signal;
for each modulation of the plurality of modulations, generating a corresponding estimate of the interfering signal, wherein a plurality of estimates of the interfering signal is generated corresponding to the plurality of modulations;
based on the plurality of estimates of the interfering signal, generating a first estimate of the interfering signal; and
based on the first estimate of the interfering signal, estimating the desired signal.

2. The method of claim 1, further comprising:
for each modulation of the plurality of modulations, generating a corresponding probability value that represents a probability of the corresponding modulation being used for transmitting the interference signal, wherein a plurality of probability values is generated corresponding to the plurality of modulations.

3. The method of claim 2, wherein generating the first estimate of the interfering signal further comprises:
based on (i) the plurality of estimates of the interfering signal and (ii) the plurality of probability values, generating the first estimate of the interfering signal.

4. The method of claim 2, further comprising:
based on (i) the plurality of probability values and (ii) the plurality of estimates of the interfering signal, determining a plurality of multiplication values, wherein each multiplication value of the plurality of multiplication values is a product of (i) a corresponding probability value of the plurality of probability values and (ii) a corresponding estimate of the interfering signal of the plurality of estimates of the interfering signal,
wherein generating the first estimate of the interfering signal further comprises
based on the plurality of multiplication values, generating the first estimate of the interfering signal.

5. The method of claim 4, wherein generating the first estimate of the interfering signal further comprises:
generating the first estimate of the interfering signal such that the first estimate of the interfering signal is a sum of each multiplication value of the plurality of multiplication values.

6. The method of claim 1, wherein estimating the desired signal further comprises:
based on subtracting a weighted value of the first estimate of the interfering signal from the plurality of signals received by the receiver, estimating the desired signal.

7. The method of claim 6, further comprising:
weighting the first estimate of the interfering signal by an interference channel matrix to generate the weighted value of the first estimate of the interfering signal.

8. The method of claim 1, further comprising:
based on estimating the desired signal, decoding the desired signal.

9. The method of claim 1, wherein:
the interfering signal is a first interfering signal;
the plurality of signals comprises (i) the desired signal, (ii) the first interfering signal, and (iii) a second interfering signal;
the first estimate of the interfering signal is a first estimate of the first interfering signal;
the method further comprises generating a first estimate of the second interfering signal; and
estimating the desired signal further comprises, based on (i) the first estimate of the first interfering signal and (ii) the first estimate of the second interfering signal, estimating the desired signal.

10. The method of claim 1, wherein the receiver is a multi-input multi-output (MIMO) receiver.

11. A system comprising:
one or more antennas configured to receive a plurality of signals, wherein the plurality of signals comprises (i) a desired signal and (ii) an interfering signal, and wherein the interfering signal is transmitted with a modulation that is unknown to the receiver; and
a data processing unit coupled to the one or more antennas, wherein the data processing unit is configured to
access a plurality of modulations, wherein one of the plurality of modulations is likely used for transmitting the interfering signal,
for each modulation of the plurality of modulations, generate a corresponding estimate of the interfering signal, wherein a plurality of estimates of the interfering signal is generated corresponding to the plurality of modulations,
based on the plurality of estimates of the interfering signal, generate a first estimate of the interfering signal, and
based on the first estimate of the interfering signal, estimate the desired signal.

12. The system of claim 11, wherein the data processing unit is further configured to:
for each modulation of the plurality of modulations, generate a corresponding probability value that represents a probability of the corresponding modulation being used for transmitting the interference signal, wherein a plurality of probability values is generated corresponding to the plurality of modulations.

13. The system of claim 12, wherein the data processing unit is further configured to generate the first estimate of the interfering signal by:
based on (i) the plurality of estimates of the interfering signal and (ii) the plurality of probability values, generating the first estimate of the interfering signal.

14. The system of claim 12, wherein the data processing unit is further configured to:
based on (i) the plurality of probability values and (ii) the plurality of estimates of the interfering signal, determine a plurality of multiplication values, wherein each multiplication value of the plurality of multiplication values is a product of (i) a corresponding probability value of the plurality of probability values and (ii) a corresponding estimate of the interfering signal of the plurality of estimates of the interfering signal,
wherein the data processing unit is further configured to generate the first estimate of the interfering signal by, based on the plurality of multiplication values, generating the first estimate of the interfering signal.

15. The system of claim 14, wherein the data processing unit is further configured to generate the first estimate of the interfering signal by:
generating the first estimate of the interfering signal such that the first estimate of the interfering signal is a sum of each multiplication value of the plurality of multiplication values.

16. The system of claim 11, wherein the data processing unit is further configured to estimate the desired signal by:
based on subtracting a weighted value of the first estimate of the interfering signal from the plurality of signals received by the receiver, estimating the desired signal.

17. The system of claim 16, wherein the data processing unit is further configured to:
weight the first estimate of the interfering signal by an interference channel matrix to generate the weighted value of the first estimate of the interfering signal.

18. The system of claim 11, wherein the data processing unit is further configured to:
based on estimating the desired signal, decode the desired signal.

19. The system of claim 11, wherein:
the interfering signal is a first interfering signal;
the plurality of signals comprises (i) the desired signal, (ii) the first interfering signal, and (iii) a second interfering signal;
the first estimate of the interfering signal is a first estimate of the first interfering signal; and
the data processing unit is further configured to generate a first estimate of the second interfering signal.

20. The system of claim 11, wherein the data processing unit is further configured to estimate the desired signal by:
based on (i) the first estimate of the first interfering signal and (ii) the first estimate of the second interfering signal, estimating the desired signal.

* * * * *